March 12, 1935.  C. G. SUITS  1,994,324
ELECTRIC CIRCUIT CONTROL MEANS
Filed May 26, 1932  2 Sheets-Sheet 1
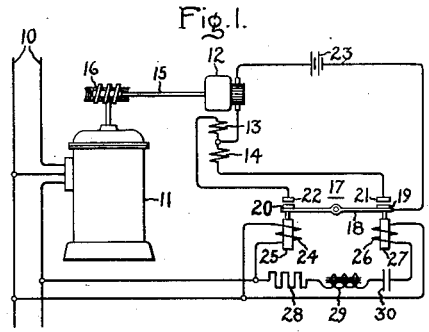
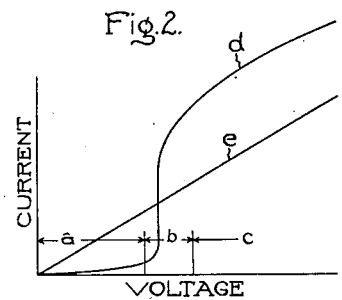
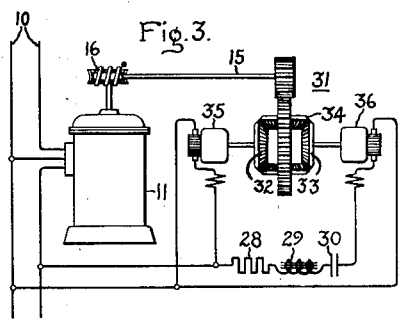
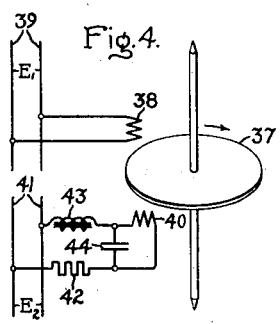
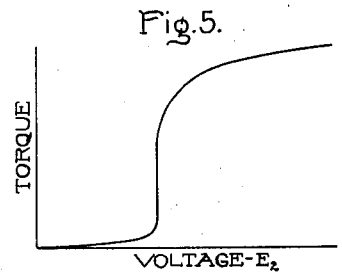
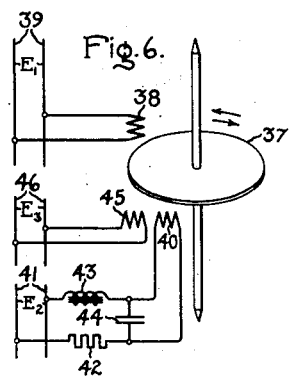
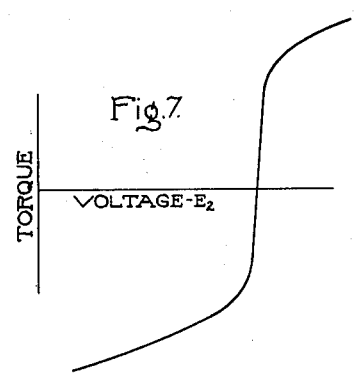
Inventor:
Chauncey G. Suits,
by Chas E. Tullar
His Attorney.

March 12, 1935.  C. G. SUITS  1,994,324
ELECTRIC CIRCUIT CONTROL MEANS
Filed May 26, 1932   2 Sheets-Sheet 2
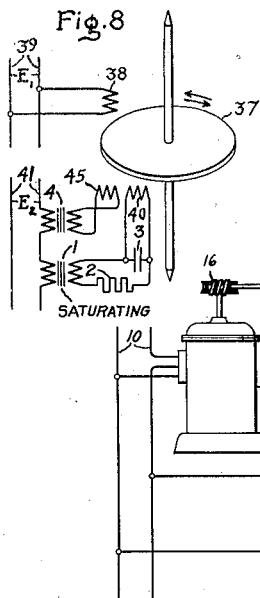
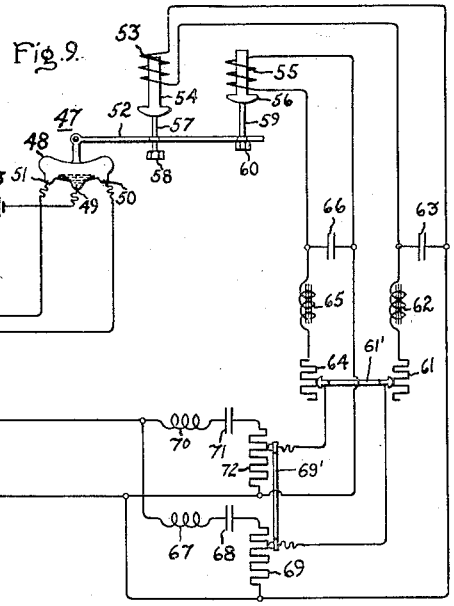
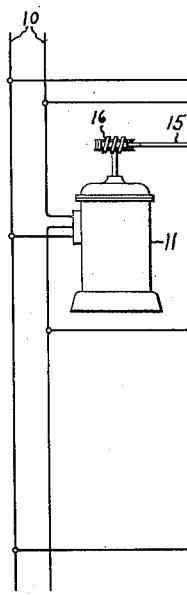
Inventor:
Chauncey G. Suits,
by Charles E. Tullar
His Attorney.

Patented Mar. 12, 1935

1,994,324

UNITED STATES PATENT OFFICE 1,994,324

ELECTRIC CIRCUIT CONTROL MEANS

Chauncey G. Suits, Schenectady, N. Y., assignor to General Electric Company, a corporation of New York Application May 26, 1932, Serial No. 613,695

37 Claims. (Cl. 171—119)

My invention relates to electric circuit control means and more particularly to electric circuit control means employing circuit elements having a non-linear volt-ampere characteristic.

In the control and regulation of electric circuits and dynamo-electric machines various types of electro-responsive means including relays have been used to actuate the mechanism of induction voltage regulators, to operate tap changers of load-ratio-control equipment, to control motor driven rheostats and to perform a multitude of similar tasks. Relays of this type would have a still greater application to problems of control and regulation if greater sensitivity could be combined with an economical structure.

It is an object of my invention to provide improved electric circuit control means which shall be relatively highly sensitive to the condition to be regulated and at the same time be rugged and economical in structure.

It is another object of my invention to provide improved circuit control means including circuit elements having non-linear volt-ampere characteristics.

My invention will be better understood from the following description taken in connection with the accompanying drawings and its scope will be pointed out in the appended claims.

In the drawings Fig. 1 is a diagrammatic illustration of one embodiment of my invention in a contact-making control relay; Fig. 2 is an illustrative curve for explaining the operation of different embodiments of my invention; Fig. 3 is a modification of the embodiment illustrated in Fig. 1 which eliminates moving contacts; Fig. 4 is another embodiment of my invention as applied to an induction disk type of relay; Fig. 5 is an illustrative curve to aid in the understanding of the operating characteristics of the embodiment illustrated in Fig. 4; Fig. 6 is a modification of the arrangement illustrated in Fig. 5; Fig. 7 is an illustrative curve relating to the operating characteristic of the embodiment illustrated in Fig. 6; Fig. 8 is a modification of the arrangement illustrated in Fig. 6 adapted for current response; Fig. 9 is an improved embodiment of the contact-making control relay illustrated in Fig. 1, and Fig. 10 is a modification of the arrangement illustrated in Fig. 9 which eliminates contacts and moving switch parts.

In accordance with my invention I provide a plurality of electro-responsive means which are included in circuits having different volt-ampere characteristics respectively and in which at least one of the electro-responsive means is included in a circuit having a non-linear volt-ampere characteristic. Electric circuits comprising circuit elements of inductance, capacitance and resistance which depend upon current are with few exceptions distinguished by non-linear volt-ampere characteristics. Throughout the specification and claims "non-linear" element or circuit will be used to designate an element or circuit having a non-linear volt-ampere characteristic for effective values of alternating current.

It has been known for some time that certain unusual resonance effects occur in circuits employing capacitances in combination with inductances having closed iron cores which are adapted to saturate magnetically. These effects are strikingly different from the well known properties of linear resonance circuits where the flux path of the inductive element is almost wholly in air. In the well known series resonant linear circuit of inductance, capacitance and resistance the voltage across the inductance is equal and opposite to the voltage across the capacitance throughout the voltage cycle. Similarly, for the parallel resonant linear circuit the inductive current and capacitive current are equal throughout the current cycle. For the non-linear circuit, with an inductance variable with current in combination with a capacitance, the condition of resonance is satisfied for only a limited portion of the voltage or current cycle. Resonance in non-linear circuits is thus regarded as partial and because of this characteristic the terminology "non-linear resonance" is employed in the claims to distinguish the subject matter of the claims from linear circuits of the same general type. If a circuit comprising a series connected resistance, capacitance and saturable inductance is properly dimensioned it will be observed that, for a gradually increasing voltage of constant frequency, the effective current is not proportional to the voltage, but changes critically at a certain voltage. This behavior is shown by curve $d$ of Fig. 2 where the effective current is plotted as a function of the sinusoidal applied voltage. There is an initial region ($a$) of small current, and a final region ($c$) of large current, wherein the effective current is nearly proportional to the voltage. There is a middle region ($b$), however, where a great and abrupt change in current takes place for a very small change in voltage. It is important to note that the percentage change in current is large for a small percentage change in voltage. For convenience I refer to the voltage at which the sudden increase of current takes place as the "resonant" voltage, and the voltage at which the sudden decrease of current takes place as the "dissonant" voltage. These two voltages may be made substantially identical with proper adjustment of the circuit constants.

The physical nature of the phenomena occurring in the critical region of the volt-ampere characteristic of the series non-linear circuit has been extensively studied and is found to be related to resonance in the analogous linear circuits in the following manner: In the linear series resonance circuit the current at the resonant frequency is resistance limited, for all values of current. In the non-linear circuit, however, the resonance region wherein the current is resistance limited is confined to a small portion of each steady state cycle. The resonance condition of the series circuit is thus dependent upon voltage in a critical manner. When the non-linear element of the circuit is a saturable inductance the dependence of the resonance condition upon voltage follows fundamentally from the saturation property of the iron core of the inductance which causes the inductance of this element to change with current. The resonance voltage is relatively insensitive to changes in circuit resistance, changes in capacitance and temperature effects. The critical property of the circuit, namely the saturation property of the iron, is an extremely constant and dependable quantity that may reasonably be expected to remain fixed over long periods of time. In the various embodiments of my present invention I utilize the extreme sensitivity to voltage or current of the non-linear circuit.

Referring to Fig. 1 of the drawings, I have shown my invention as embodied in a contact-making voltmeter arrangement of the type employed for motor driven induction regulators. The circuit 10 represents diagrammatically a feeder circuit to be controlled. An induction regulator 11 is connected in the circuit 10 in the well known manner and is arranged to be operated by any convenient electric means which is shown as a reversible motor 12. For purposes of illustration the motor 12 is shown as a simple series wound direct current motor having two field windings 13 and 14 and is arranged to actuate the rotor of the induction regulator through a shaft 15 and suitable gearing 16. The motor 12 is arranged to be controlled by an electroresponsive device which is illustrated as a contact-making voltmeter 17. The type of contact-making voltmeter shown comprises a mid-point balanced lever 18 which carries contacts 19 and 20 positioned at the ends of the lever and cooperating with fixed contacts 21 and 22 respectively. One terminal of the motor 12 is connected through a source of current illustrated as a battery 23 to the movable lever 18. The other terminal of the motor 12 is connected to a junction point between field windings 13 and 14 while the free ends of said windings are connected to the stationary contacts 22 and 21 respectively. The field windings 13 and 14 are so arranged that energization of one of the windings causes rotation of the motor in one direction and energization of the other winding causes rotation of the motor in the opposite direction.

In accordance with this embodiment of my invention I provide electroresponsive means, for operating the contact-making voltmeter 17, which comprises two electromagnets connected in circuits having different volt-ampere characteristics and so arranged that the motion of the lever 18 responds to the difference currents in the electromagnets. As illustrated one electromagnet comprises a coil 24 connected directly to the feeder circuit 10 and an armature 25 which is connected to one end of the lever 18. The other electromagnet comprises a coil 26 and an armature 27 which is connected to the other end of the lever 18. The coil 26 is connected to the feeder circuit 10 through a circuit having a non-linear volt-ampere characteristic. A circuit of this type which has been found to be satisfactory comprises a series connected resistance 28, a saturable inductance 29 and a capacitance 30.

The operation of the illustrated embodiment of my invention is as follows: The coil 24 is connected to be energized directly by the voltage of the feeder circuit 10 in such a manner that the current varies linearly with line voltage, as shown in curve $e$ of Fig. 2. The coil 26 because of its connection in a circuit with the non-linear circuit is traversed by a current which varies non-linearly with the line voltage as shown by curve $d$ of Fig. 2. It will be clear that in the illustrated arrangement there is only one value of line voltage for which the lever 18 assumes its neutral position. In this neutral position the control motor 12 is not energized and the rotor of the induction regulator is stationary. If the voltage of the feeder circuit rises above the value to be maintained constant, which is assumed to correspond to the balance point illustrated in Fig. 2, it will be observed, that the current through coil 26 increases many fold for a slight increase in voltage above the normal feeder voltage, while the current through coil 24 increases in direct proportion to the change in feeder voltage. As a result the difference current increases greatly for a very small change in voltage and the resultant force on the lever 18 effects a quick and positive closure of contacts 20 and 22. With contacts 20 and 22 closed a circuit is completed through the motor 12 and its field winding 13 so that the regulator 11 is operated in a direction to reduce the feeder voltage. If the feeder voltage falls a small percentage below the voltage for which the lever 18 is balanced the current through coil 24 decreases a relatively small amount but the current through coil 26 decreases a relatively large amount. As a result the difference current is again of a relatively large magnitude as compared to the change in feeder voltage and the resultant force on the lever is in such a direction as to close contacts 19 and 21. The circuit through the motor 12 and field winding 14 is completed so that the regulator 11 is operated in a direction to increase the feeder voltage.

In Fig. 3 of the drawings I have shown a modification of the embodiment of my invention illustrated in Fig. 1 in a regulating system for a motor-driven mechanism in which contacts have been eliminated. Here the shaft 15 of the induction regulator 11 is driven through a differential coupling 31 which for purposes of illustration in this embodiment is shown as comprising a mechanical differential gearing including two bevel gears 32 and 33 and a planetary gear 34 interposed therebetween. Motors 35 and 36 are coupled to operate the bevel gears 32 and 33 respectively. The motor 35 is connected to be energized directly from the feeder circuit 10 while the motor 36 is connected through a non-linear circuit to the feeder circuit 10. The non-linear circuit as illustrated comprises the same elements as illustrated in Fig. 1, namely the series connected resistance 28, the saturable inductance 29, and the capacitance 30.

The operation of the embodiment illustrated in Fig. 3 is substantially as follows: It will be assumed that the motor 35 is being driven in a given direction and since it is connected directly to the circuit 10 its speed will vary linearly with the line voltage. It will also be assumed that the motor 36 is being driven in the opposite direction from motor 35 and since the non-linear circuit is connected in circuit therewith its speed will vary non-linearly with the line voltage and in accordance with the characteristics of the non-linear circuit of Fig. 1. The revolutions of the shaft 15 will be determined by the sum of the revolutions of the motors 35 and 36. For the normal feeder voltage the motors will be arranged to run at the same speed and the regulator shaft will remain stationary. For line voltages of different values the regulator shaft 15 will be driven at a speed proportional to the difference speed of the motors 35 and 36 and in a direction depending upon which motor has the greater speed.

In Fig. 4 of the drawings I have illustrated an embodiment of my invention in an electroresponsive device of the induction disk type. As shown the electroresponsive device is similar in constructional details to the induction ammeter or voltmeter of the split-current type and comprises a solid conducting disk 37, for example of aluminum or copper, which is pivoted at its center and forms the moving element of the device. A coil 38, which may be referred to as the eddy current coil, is connected to be energized from a circuit 39 having a voltage $E_1$ and is positioned so as to induce eddy currents in the disk. A second coil 40 which may be referred to as the control coil is connected to be energized from a non-linear circuit which in turn is energized by a voltage $E_2$ having a relative phase displacement of the order of 90° from the voltage $E_1$. I have shown a circuit 41 which is assumed to have a voltage displaced substantially 90° from the voltage of circuit 39 for energizing a series non-linear circuit comprising a series connected resistance 42, a saturable inductance 43, and a capacitance 44. The coil 40 is connected to be energized in accordance with the voltage across the capacitance 44.

The operation of the illustrated embodiment is substantially as follows: The torque required to operate the disk is produced by the eddy current coil 38 and a small magnetic field furnished by the control coil 40. When the voltages $E_1$ and $E_2$, respectively, of circuits 39 and 41 have a relative phase displacement of the order of 90°, the torque produced in the disk is related to the voltage $E_2$ in the manner shown in the torque-voltage curve illustrated in Fig. 5. This curve shows that there is a critical voltage at which rotation of the disk begins. The arrangement thus provides a voltage sensitive relay.

In Fig. 6 I have illustrated a modification of the arrangement illustrated in Fig. 4 which is applicable for use as a voltage sensitive reversible motor, a contact-making relay or voltmeter. The electroresponsive device of this arrangement includes the elements described in connection with the disclosure of Fig. 4 and an additional control coil 45 which is connected to be energized in accordance with a voltage $E_3$, from the circuit 46, which leads the voltage $E_1$ by substantially 90°. The phase of the voltage $E_2$, of circuit 41, is arranged to lag the voltage $E_1$ by substantially 90°.

The operation of the arrangement illustrated in Fig. 6 is substantially as follows: With the assumed phase relation between the voltages $E_1$, $E_2$ and $E_3$ the current supplied to the coil 40 through the non-linear circuit varies critically at a certain value of the voltage $E_2$ so that when the circuit is in resonance, the torque tending to rotate the disk may be assumed to be clockwise and overcomes the torque applied by the coil 45. When the non-linear circuit is in its dissonant condition, the torque is supplied to the disk through the coil 45 which causes it to turn in the opposite or counter-clockwise direction. The torque is related to the voltage $E_2$ as shown by the torque-voltage curve of Fig. 7. Thus, at a critical value of voltage, the disk has zero torque. For voltage in excess of this value, the disk turns in one direction; for voltages less than the value, the disk turns in the opposite direction. There is thus provided a reversible motor, the direction of rotation of which depends upon voltage in a critical manner. The arrangement may also be used as a contact-making relay or voltmeter by closing one pair of contacts for one direction of rotation of the disk and an opposite pair of contacts for reverse rotation of the disk.

In Fig. 8 I have illustrated another embodiment of my invention of the type illustrated in Figs. 4 and 6 which is adapted for current control devices in contradistinction to voltage control devices. The electroresponsive device of this arrangement is similar to the arrangement illustrated in Fig. 6 which includes the disk 37, the eddy current coil 38 and the control coils 40 and 45. The coil 38 is connected to be energized from the circuit 39 having a voltage $E_1$ and is positioned so as to induce eddy currents in the disk. The coil 40 is connected to be energized from a parallel type of non-linear circuit comprising a saturable transformer 1 connected in series relation with the circuit 41, and a resistance 2 and a capacitance 3 connected in series relation across the secondary winding of transformer 1. The terminology "parallel-type non-linear circuit" and "series-type non-linear circuit" is used in the usual sense of expressing the circuit relationship of the inductance and capacitance with reference to the total current to the non-linear circuit. Thus if the inductance and capacities are in series relation with respect to the total current to the non-linear circuit the circuit is said to be of the series type. On the other hand, if the inductance and capacitance are in parallel relation with respect to the total current to the non-linear circuit the circuit is said to be of the parallel type. An elementary circuit for the parallel-type non-linear circuit illustrated in Fig. 8 may be readily visualized by considering the secondary winding of transformer 1 as a closed-core inductance connected in series relation in one of the conductors 41, and the resistance 2 and capacitance 3 connected in series and in a parallel circuit with the series connected inductance. In this event it will be clear that the inductance and capacitance are in parallel relation to the total current to the non-linear circuit. The circuit of the parallel-type non-linear circuit shown in Fig. 8 differs from the elementary parallel-type just described in that a transformer is used to make a high-voltage low-microfarad capacitor into the required low-voltage high-microfarad capacitor. The same transformer is caused to saturate so that electrically the circuit as illustrated differs in no important respect from the elementary parallel-type of circuit described. This type of parallel non-linear circuit wherein the impedance elements are dimensioned and correlated for critical current response is described and broadly claimed in my copending application, Serial No. 613,697, filed May 26, 1932, and assigned to the assignee of the present application. The general properties of this parallel circuit are similar to those of the series circuit except that the functions of current and voltage are reversed. A large change in voltage across the parallel branch takes place for a relatively small change in the total current to this branch, hence the energization of the winding 40 is critical in response to the current in the circuit to be controlled. It is to be noted that in this arrangement the parallel non-linear circuit must be designed so that the voltage drop across the parallel network under the resonant condition is small compared to the total voltage applied to the circuit 41 in order that the current in circuit 41 will be substantially unaffected by the changes in voltage across the parallel network. The additional control core 45 is connected through a transformer 4 to be energized in accordance with the current in circuit 41 and for purposes of illustration is shown connected in a reverse manner to the coil 40 to indicate that the fluxes of the respective coils are opposed.

The operation of the illustrated embodiment is substantially as follows: The torque required to operate the disk is produced by the eddy current coil 38 and the resultant field furnished by the control coils 40 and 45. The circuits are so adjusted that the flux furnished by coil 38 is displaced in phase with respect to the fluxes furnished by the coils 40 and 45 which are in phase opposition. When the current in circuit 41 is below a predetermined value the current in coil 45 is proportional to the current traversing circuit 41 but the current in coil 40 is substantially less or negligible so that the torque tending to rotate the disk may be assumed to be in a counterclockwise direction. At a critical value of current in circuit 41 the current in coil 40 is substantially equal and in phase with the current in coil 45. For currents in excess of this critical value, the current in the coil 40 abruptly increases in a manner similar to the current-voltage characteristics of the series circuit shown in Fig. 2. Consequently, the resultant flux and thereby the torque is such as to rotate the disk in a clockwise direction.

In Fig. 9 I have shown another embodiment of my invention as applied to a voltage regulating system in which the actuating coils of the electroresponsive device are each energized from a different non-linear circuit. For purposes of illustration I have shown the same type of regulating system as shown in Fig. 1 which comprises the induction regulator 11 connected to control the voltage of the feeder circuit 10, the rotor of the induction regulator being arranged to be controlled by means of the reversible motor 12 through the shaft 15 and gearing 16. The direction of rotation of the motor 12 is controlled by selectively energizing the field windings 13 or 14 from the battery 23 by means of a convenient type of switch 47. The switch 47 is diagrammatically illustrated as a mercury switch comprising a glass envelope 48 having mercury therein and pivoted for angular motion in either direction from a horizontal position as viewed in the drawings, and is provided with common center contact 49 and two control contacts 50 and 51, so that a circuit is completed by the mercury from contact 49 to one or the other of the control contacts depending upon the direction of angular motion of the glass envelope from the horizontal position. The contact 49 is connected to one terminal of the motor 12 and the junction between the field windings 13 and 14 is connected to the other terminal of motor 12. The free terminals of the field windings 13 and 14 are connected to the control terminals 50 and 51 respectively. As illustrated, the means for tilting the switch 47 comprises a lever 52 which is controlled by electroresponsive means connected to be energized in accordance with the voltage of the feeder circuit 10.

The electroresponsive means is shown in the form of two electromagnets, one of which comprises a coil 53 and an armature 54, and the other of which comprises a coil 55 and an armature 56. The armature 54 is connected to operate the lever 52 by means of a slot and pin connection, diagrammatically represented by the pin 57 which passes through a slot in lever 52 and is provided with a projection or stop 58 to engage the lever 52 when the armature 54 is in its attracted position. The armature 56 is similarly connected to operate the lever 52 by means of a pin 59 extending through a slot in the lever 52 and being provided with a stop 60 to engage the lever when the armature 56 is in its attracted position.

In accordance with this embodiment of my invention the coils 53 and 55 are energized by means of nonlinear circuits in such a manner that the voltage range through which the respective armatures are attracted or released is confined to a very small percentage change in voltage. The coil 53 is connected to be energized by means of a non-linear circuit which is connected to be energized from the feeder circuit 10. As shown the non-linear circuit is of the series type having the volt-ampere characteristic of the form illustrated in curve d of Fig. 1 and comprises a series connected resistance 61, a saturable inductance 62 and a capacitance 63. The coil 53 is connected to be energized in accordance with the voltage across the capacitance 63. Similarly, the coil 55 is energized in accordance with the voltage across the capacitance of a series type of non-linear circuit comprising a resistance 64, a saturable inductance 65 and a capacitance 66.

Where the circuit to be controlled is regulated for constancy of frequency the non-linear circuits may be connected directly to the circuit to be controlled without departing from my invention in its broader aspects but since the critical change of current with voltage depends upon frequency, I have found that it is desirable to compensate for the frequency variations usually encountered in commercial systems. The particular type of frequency compensation circuit which I have illustrated in this embodiment of my invention is described and broadly claimed in my copending application, Serial No. 613,696 filed May 26, 1932, and assigned to the assignee of the present application. The frequency compensation circuit which is shown comprises a linear reactor 67, a capacitance 68 and a resistance 69, all connected in series relation across the circuit 10 with the series non-linear circuit for coil 53 connected across the resistance 69. Similarly a frequency compensating circuit is provided for the non-linear circuit from which coil 55 is energized, and comprises a linear reactor 70, a capacitance 71 and a resistance 72. The series non-linear circuit for coil 53 is connected across the resistance 72.

Maximum compensating effect is obtained when the constants of the frequency compensating circuits are adjusted so that the point of inflection of the current-frequency curve is at the normal frequency of the circuit to be controlled. Then for a limited region above or below the normal frequency the current in the frequency compensating circuit will change linearly. Beyond this limited region either above or below normal frequency the change in current with frequency decreases from the maximum value. For a particular arrangement for which test data has been obtained it has been found that this limited region of perfect compensation covers approximately one cycle above and below normal frequency. By selecting appropriate values of the inductance and capacitance it is possible to obtain full frequency compensation, or over or under frequency compensation.

I have found that for satisfactory operation, in addition to the adjustment of the point of inflection of the current, frequency curve at 60 cycles for a 60 cycle system the resonant peak of the current frequency curve should occur in the range of 65 to 90 cycles. With the value of the voltage, which is to be maintained constant, impressed on the frequency compensating circuit the resistor of the frequency compensating circuit is so adjusted that the voltage drop across the resistor is sufficient to bring the non-linear circuit into resonance and this causes the particular relay energized therefrom to pick up. With the constants of the frequency compensating circuit adjusted for satisfactory compensation, an increase or decrease in frequency will cause an increase or decrease in the current flowing in the compensating circuit, and thus increase or decrease the voltage drop across the resistor of the frequency compensating circuit. This increase or decrease in voltage drop across the resistance corresponds to the increase or decrease in the resonant voltage for the same change in frequency, so that for a given impressed voltage across the frequency compensating circuit, the relay will pick up at this voltage over a range in frequency variation of two cycles. A similar constancy of drop out of the relay is obtained due to change in dissonant voltage by the change in current in the frequency compensating circuit resistance.

The resistance units 61 and 64 in the non-linear circuits, and the resistance units 69 and 72 in the corresponding frequency compensating circuits may be made adjustable as shown in the drawings. The adjustable resistance in the non-linear circuit is used to vary the dissonance voltage and thereby to change the width of band of voltage which is being held; that is, the amount of voltage variation allowable without an operation of the motor adjusting the induction voltage regulator. The resistance in the frequency compensating circuit may be varied to obtain the value of voltage at which the armatures of the electromagnets will pick up. The resistances of both non-linear circuits may be mounted so that a single adjustment, for example by an arm 61', affects both non-linear circuits and the resistances in the frequency compensating circuits may be mounted in a similar manner so that adjustments to both circuits may be made simultaneously by an arm 69'.

The operation of the illustrated embodiment is substantially as follows: By way of example, it will be assumed that armature 56 is arranged to pick up and release in the range of 109±.2 volts and that the armature 54 is arranged to pick up and release in the range of 111±.2 volts. If the voltage which is being regulated is less than 109 volts, both armatures are released and the lever arm 52 is at its lowest position. The mercury switch 47 is so rotated that the contacts 49 and 50 close. These contacts close a circuit through the motor 12 and field winding 13 to run the motor 12 in such a direction as to increase the feeder circuit voltage. When the feeder circuit voltage is restored by this action to 109 volts, the armature 56 will be attracted by the coil 55 which is energized by its voltage sensitive non-linear circuit 64—65—66. The upward movement of the armature 56 causes the arm 52 to move to its mid-position, thus rotating the mercury switch in such a manner that the contact 49 is at its neutral position and both circuits through contacts 50 and 51 are open. If the voltage should rise above 111 volts the solenoid 53 will be energized thereby rotating the mercury switch 47 sufficiently to close contacts 49 and 51, and a circuit will be closed through motor 12 and field winding 14 to run motor 12 in such a direction as to decrease the voltage of feeder circuit 10. Thus the voltage of the feeder circuit may be regulated between arbitrary limits which may be very close depending upon the adjustment of the circuit elements in the non-linear circuits.

In Fig. 10 of the drawings, I have shown another embodiment of my invention employing electroresponsive means energized from non-linear circuits but in which the control is effected wholly by electric means entirely stationary in contradistinction to mechanical means of the arrangement shown in Fig. 9. For purposes of illustration I have shown the induction regulator 11 for controlling the feeder circuit 10. The rotor of the induction regulator is controlled by an alternating current motor 73 which is connected to be energized from any convenient source of suitable current and as shown is connected to be energized from the circuit 10. The motor 73 is provided with two field windings 74 and 75 which are so arranged that the resultant field excitation and direction of rotation of the motor are controlled by the relative energizations of the respective field windings. One terminal of motor 73 is connected to a conductor of circuit 10 and the other terminal is connected to a junction point of field windings 74 and 75.

The arrangement for controlling the resultant field excitation of motor 73 comprises saturable reactors $S_1$ and $S_2$ provided with alternating current windings 76 and 77, respectively, and direct current saturating windings 78 and 79, respectively. The reactors may comprise various constructions such, for example, as has been employed in certain types of reactors where a four legged core is provided having three windings wound thereon, such a reactor being disclosed in Alexanderson's Patent No. 1,328,610 of January 20, 1920. If desired the reactor may be in the form of a three legged core as shown in the drawings. In this event the windings 76 and 77 are connected in series, and the junction point therebetween is connected to a conductor of circuit 10 and the free terminals of the windings 76 and 77 are connected to the free terminals of the field windings 74 and 75 respectively. The windings 78 and 79 are selectively energized with direct current in a manner to effect magnetic saturation so that the impedance of the alternating current windings is varied and thereby the resultant field excitation and direction of rotation of motor 73 is controlled.

In accordance with my invention the desired control is provided by properly energizing the saturating windings 78 and 79 of reactors $S_1$ and $S_2$ by non-linear circuits in a manner analogous to to that used in the embodiment illustrated in Fig. 9. In the arrangement as shown two non-linear circuits N and M comprising, respectively, a series connected resistance 80, a capacitance 81 and a saturable inductance 82, and a series connected resistance 83, a capacitance 84 and a saturable inductance 85, are energized in parallel through a frequency compensating network comprising a capacitance 86, a resistance 87, and a linear inductance 88 from the circuit 10. The non-linear circuits are connected across the resistance 87. The saturating winding 78 of reactor $S_1$ is connected to be energized in accordance with the voltage across the capacitance 81 in the non-linear circuit N through rectifying means 89, which may be of any suitable construction, as shown the rectifiers are of the dry surface contact type such, for example, of the type disclosed in United States Letters Patent No. 1,640,335 granted August 23, 1927, upon an application of Lars O. Grondahl. Similarly, the saturating winding 79 of reactor $S_2$ is connected to be energized in accordance with the voltage across the capacitance 84 in the non-linear circuit M through rectifying means 90. It is necessary to provide means for saturating one reactor, for example $S_2$, when the line voltage is below the regulated value and the other reactor, $S_1$, when the voltage is above the regulated value. For controlling the saturating current of reactor $S_2$ I connect a transformer 91 across the resistance 87 of the frequency compensating circuit which is arranged to provide a voltage across the secondary winding thereof having such phase and magnitude that when the non-linear circuit M is in resonance the sum of the voltage of transformer 91 and the voltage of condenser 84 is small or substantially zero, whereas when the circuit M is dissonant the condenser voltage is small or zero but the sum of the condenser voltage and transformer voltage is large. Other subtractive methods of control of the saturable reactors will occur to those skilled in the art and may be used without departing from my invention in its broader aspects.

The operation of the embodiment of my invention illustrated in Fig. 10 is substantially as follows: When the voltage of circuit 10 is less than the value to be maintained constant both non-linear circuits M and N are adjusted to be dissonant. As a result the voltages across condensers 81 and 84 are small but the reactor $S_2$ is saturated due to the effect of transformer 91. As a result the circuit through field winding 75 is closed through a low impedance and the net field excitation of motor 73 is determined by field winding 75 so that the motor 73 is arranged to rotate in a direction to increase the feeder voltage. When the voltage is returned to the normal value, or value to be maintained constant, the circuit M becomes resonant and reactor $S_2$ becomes desaturated since the resultant voltage of transformer 91 and capacitance 84 decreases substantially to zero. Under these conditions equal and high impedances are connected in circuit with the respective field windings 74 and 75 and the motor 73 does not operate. When the voltage of the feeder circuit 10 becomes greater than the regulated value, the circuit N becomes resonant and the reactor $S_1$ saturates. As a result the circuit through field winding 74 is closed through a low impedance and the net field excitation of motor 73 is determined by field winding 74 so that motor 73 is arranged to rotate in a direction to decrease the feeder voltage.

While I have shown and described particular embodiments of my invention it will occur to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. An electro-responsive device, an electric circuit therefor including an electric winding, said electric circuit having a predetermined volt-ampere characteristic over a given range of variation of one of the quantities of its volt-ampere characteristic applied to said circuit, a second winding cooperating with said first mentioned winding, and means connected in circuit with said second winding and comprising an impedance network having a volt-ampere characteristic differing from the volt-ampere characteristic of said first mentioned circuit for one of the quantities of its volt-ampere characteristic applied to said network over the same range of variation as the variable quantity applied to said first mentioned circuit for abruptly changing an operating condition of said electroresponsive device at a predetermined value of the quantity applied to one of said circuits.

2. An electro-responsive device, an electric circuit therefor including an electric winding, said electric circuit having a predetermined volt-ampere characteristic over a given range of variation of one of the electric quantities of its volt-ampere characteristic applied to said circuit, a second winding cooperating with said first mentioned winding, and an impedance network including a non-linear inductance and a linear capacitance adjusted for non-linear resonance and connected in circuit with said second winding for abruptly changing the energization of said second winding relative to the energization of said first mentioned winding with the simultaneous application to said electric circuit and to said network of the same value of said applied electric quantity.

3. An electro-responsive device, an electric circuit therefor including an electric winding, said electric circuit having a pre-determined volt-ampere characteristic over a given range of variation of one of the electric quantities of its volt-ampere characteristics applied to said circuit, a second winding cooperating with said first mentioned winding, and an impedance network comprising a resistance, a capacitance and a saturable inductance connected in series relation and in circuit with said second winding and adjusted for non-linear resonance for abruptly changing the energization of said second winding relative to the energization of said first mentioned winding with the simultaneous application to said electric circuit and to said network of the same value of said applied electric quantity.

4. An electroresponsive device comprising a plurality of cooperating windings, and a parallel-type non-linear resonant circuit connected in circuit with one of said windings and comprising a saturable inductance in parallel relation with a capacitance and a resistance for producing an abrupt change in voltage across said one of said windings relative to the voltage across another of said windings at a critical value of the total current to said non-linear circuit.

5. In combination, an electric circuit, means comprising a plurality of cooperating windings for controlling an electrical characteristic of said circuit, and means connected in circuit with one of said windings and comprising an impedance network including a capacitance and an inductance adjusted for non-linear resonance and having a non-linear variation between different electrical characteristics thereof for abruptly changing the energization of one of said windings relative to the energization of another of said windings at a critical value of the electrical characteristic of said electric circuit to be controlled.

6. In combination, an electric circuit, means comprising a plurality of cooperating windings for controlling an electrical characteristic of said circuit, and a series non-linear circuit connected to energize one of said windings from said electric circuit and comprising a resistance, a capacitance, and a saturable inductance, said capacitance and inductance being adjusted for non-linear resonance for abruptly changing the energization of said one winding relative to the energization of another of said windings at a critical voltage of said electric circuit.

7. In combination, an electric circuit, means comprising a plurality of cooperating windings for controlling an electrical characteristic of said circuit, and a parallel-type non-linear circuit connected to energize one of said windings from said electric circuit and comprising a saturable inductance and a capacitance in parallel relation so correlated as to have a voltage thereacross which changes abruptly relative to the voltage across another of said windings at a critical value of current in said electric circuit.

8. An electroresponsive device comprising a pair of winding circuits having respectively linear and non-linear characteristics between different electrical characteristics of the respective circuits, said non-linear circuit including a capacitance and an inductance adjusted for non-linear resonance for producing an abrupt change in one characteristic of said non-linear circuit at a critical value of a different characteristic of said non-linear circuit, and means operative for movement in accordance with a function of the currents in said pair of windings.

9. In combination, an electric circuit, an electroresponsive device comprising a movable member, means comprising a pair of windings for exerting a force upon said movable member which varies in accordance with a predetermined function of the currents in the respective windings, and means including an inductance and a capacitance adjusted for non-linear resonance for energizing one of said windings by a current which varies non-linearly and abruptly with an electrical characteristic of the other of said windings at a predetermined value of an electrical characteristic of said circuit.

10. In combination, an electric circuit, an electroresponsive device comprising a movable member, means comprising a pair of windings for exerting a force upon said movable member which varies in accordance with a predetermined function of the currents in the respective windings, and a non-linear circuit connected to energize one of said windings from said electric circuit and comprising a series connected saturable inductance and a capacitance adjusted with said inductance for non-linear resonance for producing an abrupt change in current relative to the current in said other winding at a critical value of the voltage of said electric circuit.

11. In an induction motive device, an inducing member comprising a plurality of windings, a movable induced member, and a non-linear circuit including a capacitor and an inductance adjusted for non-linear resonance and connected in circuit with one of said windings for producing an abrupt change in one electrical characteristic relative to the same electrical characteristic of another of said windings at a critical value of a different electrical characteristic for causing movement of said induced member at the critical value of the electrical characteristic of said non-linear circuit.

12. In an induction motive device, an inducing member comprising an excitation winding, a movable induced member, a control winding cooperating with said excitation winding for causing movement of said induced member, and an impedance network connected in circuit with said control winding and comprising a capacitance and a saturable inductance, said capacitance and said inductance being adjusted for non-linear resonance for causing movement of said movable induced member at a critical branch voltage of said network.

13. In an induction motive device, a movable induced member, an inducing member comprising a plurality of cooperating windings for actuating said induced member, and a non-linear circuit connected in circuit with one of said windings and having an abrupt change in one electrical characteristic relative to the same electrical characteristic of another of said windings at a critical value of a different electrical characteristic of said one winding for selectively changing the direction of movement of said induced member at the critical value of the electrical characteristic of said non-linear circuit.

14. In an alternating-current motive device, an inducing member comprising a pair of windings for producing fluxes relatively displaced in phase, a third winding for producing a flux in phase with the flux of one of said windings, a closed circuit induced member, and a non-linear circuit connected in circuit with said third winding.

15. In an alternating-current motive device, an inducing member comprising a main winding and two control windings for producing fluxes which lead and lag, respectively, the flux produced by said main winding when all of said windings are energized, a closed circuit induced member, and a non-linear circuit comprising a series connected resistance capacitance and saturable reactor, one of said control windings being connected to be energized in accordance with the voltage across the capacitance of said non-linear circuit.

16. In an alternating-current motive device, an inducing member comprising a main winding and two control windings for producing fluxes which lead and lag, respectively, the flux produced by said main winding when all of said windings are energized, a closed circuit induced member, and a parallel-type non-linear circuit comprising a saturable inductance in parallel relation with a capacitance, one of said control windings being connected across said capacitance.

17. In combination, an electric circuit, means for controlling an electrical condition of said circuit, means for controlling said circuit controlling means comprising a plurality of windings, and a plurality of circuits connected to said electric circuit, each of said plurality of circuits having a different non-linear volt-ampere characteristic and each being connected in circuit with a different one of said windings.

18. In combination, an electric circuit, means for controlling an electrical condition of said circuit, means for controlling said circuit controlling means comprising a plurality of windings, and a plurality of non-linear circuits connected to said electric circuit, each of said plurality of circuits having a different resonant electrical characteristic and each being connected in circuit with a different one of said windings.

19. In combination, an electric circuit, means for controlling an electrical condition of said circuit, means for controlling said circuit controlling means comprising a plurality of windings, and a plurality of non-linear circuits connected to said electric circuit, each of said plurality of non-linear circuits comprising a series connected resistance, capacitance and a saturable reactor and each having a different resonant voltage, each of said windings being connected across the capacitance of a different one of said non-linear circuits.

20. In combination, an electric circuit, means for controlling an electrical characteristic of said circuit, means for controlling said circuit controlling means, a pair of windings for controlling said last mentioned means, a non-linear circuit having a resonant electrical characteristic at a predetermined value of said electrical characteristic of said circuit interposed between one of said windings and said electric circuit, and a non-linear circuit having a resonant electrical characteristic higher than said predetermined value of said electrical characteristic interposed between the other of said windings and said electric circuit.

21. In combination, an electric circuit, means for controlling an electrical characteristic of said circuit, means for controlling said circuit controlling means, a plurality of windings for controlling said last-mentioned means, and a plurality of non-linear circuits each having a different resonant electrical characteristic connected in parallel relation to said electric circuit, each of said windings being connected to be energized from a different one of said non-linear circuits.

22. In combination, an electric circuit, means for controlling the voltage of said circuit, switching means normally biased to one switching position and movable to different switching positions for controlling said circuit controlling means, a pair of windings for changing the position of said switching means, a non-linear circuit connected to said electric circuit and to one of said windings for abruptly increasing the energization of said winding in a manner to move said switching means from its normally biased switching position to a neutral switching position when the voltage of said electric circuit is at a predetermined normal value, and a second non-linear circuit connected to said electric circuit and to the other of said windings for abruptly increasing the energization of said winding in a manner to move said switching means from said neutral switching position to a switching position different from said first-mentioned position when the voltage of said electric circuit is above a predetermined value.

23. In combination, an electric circuit, means for controlling the voltage of said circuit, switching means for controlling said circuit controlling means, a pair of windings for changing the position of said switching means, two non-linear circuits each comprising a series connected resistance, capacitance and saturable inductance, each of said non-linear circuits being arranged to have a different resonant voltage, means for adjusting the dissonant voltage of said non-linear circuits, each of said pair of windings being connected to be responsive to the voltage of a capacitance in a different one of said non-linear circuits, means for rendering the resonant and dissonant voltages of each of said non-linear circuits independent of variations in the frequency of said electric circuit comprising two branch circuits each including a resistance, a capacitance and a linear inductance, said branch circuits being connected in parallel relation to said electric circuit and each of said non-linear circuits being connected across the resistance of a different branch circuit, and means for adjusting the voltage of each frequency compensating branch circuit which is impressed upon the respective non-linear circuits.

24. In combination, an electric circuit, means for controlling the voltage of said circuit, switching means for controlling said circuit controlling means, a pair of windings for changing the position of said switching means, two non-linear circuits each comprising a series connected resistance, capacitance and saturable inductance, each of said non-linear circuits being arranged to have a different resonant voltage, means for simultaneously adjusting the resistances in the respective non-linear circuits, each of said pair of windings being connected to be responsive to the voltage of a capacitance in a different one of said non-linear circuits, means for rendering the resonant and dissonant voltages of each of said non-linear circuits independent of variations in the frequency of said electric circuit comprising two branch circuits each including a resistance, a capacitance and a linear inductance, said branch circuits being connected in parallel relation to said electric circuit and each of said non-linear circuits being connected across a resistance of a different branch circuit, and means for simultaneously adjusting the resistances in the respective branch circuits.

25. An electric circuit control device comprising saturable inductance means having alternating current windings and direct current windings, and a plurality of circuits each having different non-linear volt-ampere characteristics and each being connected for controlling the energization of a different one of said direct current windings.

26. An electric circuit control device comprising saturable inductance means having alternating current windings and direct current windings, and a plurality of non-linear circuits having different resonant voltages and each being connected for energizing a different one of said direct current windings.

27. An electric circuit control device comprising saturable inductance means having alternating current windings and direct windings, a plurality of non-linear circuits having different resonant voltages and each comprising a series connected resistance, capacitance and saturable inductance, each of said direct current windings being connected to be energized from a capacitance in a different non-linear circuit, and rectifying means interposed between each of said capacitances and said direct current windings.

28. In combination, an electric circuit, an electroresponsive device connected to be energized therefrom, saturable inductance means having alternating current windings connected in circuit with said electroresponsive device and direct current windings for controlling the impedance of said alternating current windings, and a plurality of circuits having different non-linear volt-ampere characteristics for controlling the relative energizations of said direct current windings in accordance with an electrical characteristic of said electric circuit.

29. In combination, an electric circuit, an electroresponsive device connected to be energized therefrom, saturable inductance means comprising a pair of alternating current windings connected in circuit with said electroresponsive device and a pair of direct current windings for controlling the impedance of said alternating current windings, and a pair of non-linear circuits having different resonant voltages and each being connected for selectively and abruptly changing the energization of said direct current windings in accordance with an electrical characteristic of said electric circuit.

30. In combination, an electric circuit, an electroresponsive device comprising a plurality of windings connected to be energized from said circuit, saturable inductance means comprising alternating current windings connected in series relation with the windings of said electroresponsive device, direct current windings for controlling the impedance of said alternating current windings, and a plurality of non-linear circuits each having different critical response voltages, each of said non-linear circuits being connected to energize a different direct current winding for varying the relative energizations of the windings of said electroresponsive device in accordance with variations in the voltage of said electric circuit.

31. In combination, an electric circuit, a dynamo-electric device connected to said electric circuit and having two control windings for controlling the direction of rotation of said device in accordance with the relative energizations of said windings, saturable inductance means comprising a pair of alternating current windings connected in series relation with said control windings for controlling the relative energizations thereof, a pair of direct current windings arranged one for each alternating current winding for controlling the impedance of the alternating current winding associated therewith, and a pair of non-linear circuits connected to said electric circuit and connected respectively to different direct current windings for selectively changing the energization thereof in accordance with the variations of the voltage of said electric circuit from a predetermined value.

32. In combination, an electric circuit, an electric motor connected to be energized from said circuit, an energizing circuit for said motor comprising two windings for producing component fields relatively variable for selectively determining the direction of rotation of said motor, a pair of saturable reactors having alternating current windings connected in series relation with said motor windings, direct current saturating windings arranged one for each reactor, a pair of non-linear circuits connected in parallel relation to said electric circuit and each comprising a series connected resistance, capacitance and a saturable inductance, said non-linear circuits being adjusted to have respectively a resonant voltage at the predetermined normal voltage and above said normal voltage of said electric circuit, means comprising a rectifier for energizing one of said direct current windings from the capacitance in one of said non-linear circuits, means comprising a second rectifier for energizing the other of said direct current windings from the capacitance in the other of said non-linear circuits, and means for introducing a voltage component having such phase and magnitude as to oppose the voltage from said first mentioned rectifier when the non-linear circuit associated therewith is resonant.

33. In combination, an electric circuit, regulating means for controlling the voltage of said circuit, reversible dynamo-electric means for controlling said regulating means, a pair of saturable reactors each having an alternating current winding and having said windings connected in series relation with said dynamo-electric means and arranged to prevent operation of said motor when the impedance of both windings is relatively high and to cause operation in one or the other direction when the impedance of one winding is low relatively to the other, direct current saturating windings for controlling the impedance of said reactors, a pair of non-linear circuits each comprising a series connected resistance, capacitance and a saturable inductance, said non-linear circuits being adjusted to have respectively a resonant voltage at the predetermined normal voltage and above said normal voltage of said circuit, means comprising a rectifier for energizing one of said direct current windings from the capacitance in one of said non-linear circuits, means comprising a second rectifier for energizing the other of said direct current windings from the capacitance in the other of said non-linear circuits, means comprising a series connected condenser, a resistance, and a linear inductance for energizing said non-linear circuits from said electric circuit, said non-linear circuits being connected in parallel across said resistance, a transformer connected across said resistance and having its secondary winding connected in series relation with the voltage from said first-mentioned rectifier and its secondary voltage adjusted in phase and magnitude to oppose said rectifier voltage when the non-linear circuit associated therewith is resonant.

34. An electroresponsive device, an electric circuit therefor, said electric circuit having a predetermined volt-ampere characteristic over a given range of variation of one of the quantities of its volt-ampere characteristic applied to said circuit, a second electric circuit cooperating with said first mentioned circuit and having a volt-ampere characteristic differing from the volt-ampere characteristic of said first mentioned circuit for one of the quantities of its volt-ampere characteristic applied to said second electric circuit over the same range of variation as the variable quantity applied to said first mentioned circuit for abruptly changing an operating condition of said electroresponsive device at a predetermined value of the quantity applied to one of said circuits.

35. An electroresponsive device, an electric circuit therefor having a predetermined volt-ampere characteristic over a given range of variation of applied voltage, and a second electric circuit cooperating with said first mentioned electric circuit and having a volt-ampere characteristic differing from the volt-ampere characteristic of said first mentioned circuit over the same range of variation of voltage applied to said second electric circuit as the variable voltage applied to said first mentioned electric circuit for abruptly changing an operating condition of said electro-responsive device at a predetermined value of the voltage applied to one of said electric circuits.

36. In combination, an electric circuit, an electric motor, means for controlling said motor in response to an electrical characteristic of said circuit, said means comprising a plurality of windings and a plurality of circuits connected to said electric circuit, each of said plurality of circuits having a different non-linear volt-ampere characteristic and each being connected in circuit with a different one of said windings.

37. In combination, an electric circuit, an electric motor, means for controlling said motor in response to an electrical characteristic of said circuit, a pair of windings for controlling said last mentioned means, and a non-linear circuit interposed between one of said windings and said electric circuit, and a second non-linear circuit interposed between the other of said windings and said electric circuit, one of said non-linear circuits having a resonant electrical characteristic at a predetermined characteristic of said electric circuit, and the other of said non-linear circuits having a resonant electrical characteristic at a higher predetermined characteristic of said electric circuit.

CHAUNCEY G. SUITS.

CERTIFICATE OF CORRECTION.

Patent No. 1,994,324. March 12, 1935.

CHAUNCEY G. SUITS.

It is hereby certified that error appears in the printed specification of the above numbered patent requiring correction as follows: Page 3, second column, line 53, for "capacities" read capacitance: page 6, first column, line 9, strike out the word "to"; page 8, second column, line 69, claim 27, before "windings" second occurrence insert the word current; and that the said Letters Patent should be read with these corrections therein that the same may conform to the record of the case in the Patent Office.

Signed and sealed this 23rd day of April, A. D. 1935.

(Seal)

Leslie Frazer
Acting Commissioner of Patents.